United States Patent
Indurkar

(10) Patent No.: US 11,477,636 B1
(45) Date of Patent: Oct. 18, 2022

(54) ELECTRONIC SUBSCRIBER IDENTITY MODULE (ESIM) PROFILE PROVISIONING

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 77 days.

(21) Appl. No.: 17/023,352

(22) Filed: Sep. 16, 2020

(51) Int. Cl.
*H04W 8/18* (2009.01)

(52) U.S. Cl.
CPC ..................... *H04W 8/18* (2013.01)

(58) Field of Classification Search
CPC ........................................ H04W 8/18
USPC ........................................ 455/418
See application file for complete search history.

(56) References Cited

U.S. PATENT DOCUMENTS

| | | | |
|---|---|---|---|
| 6,469,998 B1 * | 10/2002 | Burgaleta Salinas | H04L 29/12311 370/468 |
| 9,451,098 B2 * | 9/2016 | Zhu | H04M 15/8011 |
| 10,455,536 B1 | 10/2019 | Khawand et al. | |
| 10,833,929 B2 | 11/2020 | Watsen et al. | |
| 10,880,711 B1 | 12/2020 | Holmes | |
| 10,887,741 B1 | 1/2021 | Indurkar | |
| 11,102,646 B1 | 8/2021 | Indurkar | |
| 11,115,810 B1 | 9/2021 | Indurkar | |
| 11,140,543 B1 | 10/2021 | Indurkar | |
| 11,190,985 B1 | 11/2021 | Indurkar | |
| 11,310,654 B1 | 4/2022 | Indurkar | |
| 2005/0175019 A1 * | 8/2005 | Kalavade | H04W 12/06 370/400 |

(Continued)

FOREIGN PATENT DOCUMENTS

| | | |
|---|---|---|
| DE | 102016201360 A1 | 8/2016 |
| EP | 2448301 A1 | 5/2012 |

(Continued)

OTHER PUBLICATIONS

Notice of Allowance dated Jun. 14, 2021, U.S. Appl. No. 16/880,723, filed May 21, 2020.

(Continued)

*Primary Examiner* — Ahmad F. Matar
*Assistant Examiner* — Jirapon Intavong

(57) ABSTRACT

A method of provisioning a mobile communication device with an eSIM profile. The method comprises receiving an indication by an application executing on a computer system that a subscriber associated with a mobile communication device provisioned with a first eSIM profile associated with a first network is traveling to a second network, maintaining a pool of eSIM profiles associated with the second network by the application, designating a second eSIM profile that is one of the eSIM profiles in the pool as allocated by the application, sending a copy of the second eSIM profile to the mobile communication device, receiving an indication by the application that the mobile communication device has deactivated the second eSIM profile, and, after receiving the indication that the mobile communication device has deactivated the second eSIM profile, designating the second eSIM profile in the pool as unallocated by the application.

14 Claims, 10 Drawing Sheets

(56) References Cited

U.S. PATENT DOCUMENTS

| | | | |
|---|---|---|---|
| 2005/0192035 A1* | 9/2005 | Jiang | H04W 8/26 455/461 |
| 2011/0246374 A1 | 10/2011 | Franz | |
| 2012/0252445 A1* | 10/2012 | Lindholm | H04W 8/26 455/433 |
| 2013/0029637 A1* | 1/2013 | Hillier | H04W 8/26 455/411 |
| 2015/0303966 A1 | 10/2015 | Lee et al. | |
| 2015/0334552 A1 | 11/2015 | Li et al. | |
| 2016/0020802 A1 | 1/2016 | Lee et al. | |
| 2016/0020803 A1 | 1/2016 | Cha et al. | |
| 2016/0021484 A1 | 1/2016 | Park et al. | |
| 2016/0092145 A1 | 3/2016 | Manning et al. | |
| 2016/0119780 A1 | 4/2016 | Jung et al. | |
| 2016/0246611 A1 | 8/2016 | Li et al. | |
| 2016/0255567 A1 | 9/2016 | Petersson et al. | |
| 2016/0269891 A1 | 9/2016 | Chen et al. | |
| 2016/0308768 A1 | 10/2016 | Yoon et al. | |
| 2017/0118622 A1* | 4/2017 | Jiang | H04W 4/20 |
| 2017/0289788 A1 | 10/2017 | Lalwaney | |
| 2018/0014178 A1 | 1/2018 | Baek et al. | |
| 2018/0014184 A1 | 1/2018 | Schell et al. | |
| 2018/0376325 A1 | 12/2018 | Xu et al. | |
| 2019/0058983 A1 | 2/2019 | Guven et al. | |
| 2019/0058989 A1 | 2/2019 | Park et al. | |
| 2019/0132204 A1 | 5/2019 | McGrath et al. | |
| 2019/0140837 A1 | 5/2019 | Cheng et al. | |
| 2019/0208405 A1 | 7/2019 | Park et al. | |
| 2020/0120494 A1 | 4/2020 | Fares et al. | |
| 2020/0154263 A1 | 5/2020 | Guday et al. | |
| 2020/0178070 A1 | 6/2020 | Yang et al. | |
| 2020/0221294 A1 | 7/2020 | Kang et al. | |
| 2020/0228488 A1 | 7/2020 | Xu et al. | |
| 2020/0236529 A1 | 7/2020 | Anslot et al. | |
| 2020/0260241 A1 | 8/2020 | Sicard | |
| 2020/0322846 A1 | 10/2020 | Hampali et al. | |
| 2020/0322884 A1 | 10/2020 | Di Girolamo et al. | |
| 2020/0351651 A1 | 11/2020 | Koo et al. | |
| 2020/0351761 A1 | 11/2020 | Horna | |
| 2020/0389783 A1 | 12/2020 | Kang et al. | |
| 2020/0404501 A1 | 12/2020 | Kang et al. | |
| 2021/0029761 A1 | 1/2021 | Jung et al. | |
| 2021/0076195 A1 | 3/2021 | Chaugule et al. | |
| 2021/0112401 A1 | 4/2021 | Chadwick et al. | |
| 2021/0112413 A1 | 4/2021 | Pazhyannur | |
| 2021/0112423 A1* | 4/2021 | Maheshwari | H04W 4/029 |
| 2021/0120387 A1 | 4/2021 | Roy et al. | |
| 2021/0120424 A1 | 4/2021 | Kang et al. | |
| 2021/0306830 A1 | 9/2021 | Williams et al. | |
| 2021/0377722 A1 | 12/2021 | Fan et al. | |
| 2021/0377808 A1 | 12/2021 | Indurkar | |
| 2022/0191678 A1 | 6/2022 | Indurkar | |

FOREIGN PATENT DOCUMENTS

| | | |
|---|---|---|
| WO | 2018018332 A1 | 10/2018 |
| WO | 20210242697 A1 | 12/2021 |

OTHER PUBLICATIONS

FAIPP Pre-Interview Communication dated Apr. 15, 2021, U.S. Appl. No. 16/880,723, filed May 21, 2020.

Indurkar, Dhananjay, et al., "Embedded Subscriber Identity Module (eSIM) Profile Adaptation Based on Context," filed May 21, 2020, U.S. Appl. No. 16/880,723.

Notice of Allowace dated May 19, 2021, U.S. Appl. No. 16/821,937, filed Mar. 17, 2020.

FAIPP Pre-Interview Communication dated Mar. 26, 2021, U.S. Appl. No. 16/821,937, filed Mar. 17, 2020.

Indurkar, Dhananjay, et al., "Bootstrap Electronic Subscriber Identity Module Configuration," filed Mar. 17, 2020, U.S. Appl. No. 16/821,937.

Notice of Allowance dated Apr. 29, 2021, U.S. Appl. No. 16/821,943, filed Feb. 19, 2021.

FAIPP Pre-Interview Communication dated Jan. 29, 2021, U.S. Appl. No. 16/821,943, filed Feb. 19, 2021.

Indurkar, Dhananjay, et al., "Triggering Electronic Subscriber Identity Module Activation", filed Mar. 17, 2020, U.S. Appl. No. 16/821,943.

Notice of Allowance dated Sep. 4, 2020, U.S. Appl. No. 16/821,950, filed Feb. 17, 2020.

Indurkar, Dhananjay, et al., "Activation Communication Addresses of Internet of Things Devices", filed Nov. 24, 2020, U.S. Appl. No. 17/102,627.

FAIPP Pre-Interview Communication dated Apr. 5, 2021, U.S. Appl. No. 16/886,521, filed May 28, 2020.

Indurkar, Dhananjay, et al., "Internet of Things (IoT) Devices Wireless Communication Service Management Platform" filed May 28, 2020, U.S. Appl. No. 16/886,521.

Indurkar, Dhananjay, et al., "Electronic Subscriber Identity Module (eSIM) Profile Delivery and Activation System and Methods" filed Sep. 16, 2020, U.S. Appl. No. 17/023,347.

Indurkar, Dhananjay, et al., "Embedded Subscriber Identity Module (eSIM) Profile Adaptation Based on Context," filed May 18, 2021, International Application No. PCT/US21/33041.

Indurkar, Dhananjay, et al., "Internet of Things (IoT) Devices Wireless Communication Service Management Platform" filed May 24, 2021, International Application No. PCT/US21/33922.

Foreign Communication From a Related Counterpart Application, International Search Report and Written Opinion dated Sep. 28, 2021, International Application No. PCT/US2021/033922 filed on May 24, 2021.

Indurkar, Dhananjay, et al., "Electronic Subscriber Identity Module (eSIM) Profile Delivery and Activation System and Methods" filed Feb. 28, 2022, U.S. Appl. No. 17/683,328.

Notice of Allowance dated Dec. 30, 2021, U.S. Appl. No. 17/023,347, filed Sep. 16, 2020.

Foreign Communication From a Related Counterpart Application, International Search Report and Written Opinion dated Sep. 28, 2021, International Application No. PCT/US2021/033041 filed on May 18, 2021.

Notice of Allowance dated Aug. 10, 2021, U.S. Appl. No. 16/886,521, filed May 28, 2020.

Indurkar, Dhananjay, "Embedded Subscriber Identity Module (eSIM) Profile Adaptation Based on Context," filed Aug. 27, 2021, U.S. Appl. No. 17/459,763.

Indurkar, Dhananjay, "Bootstrap Electronic Subscriber Identity Module Configuration," filed Aug. 20, 2021, U.S. Appl. No. 17/408,366.

Notice of Allowance dated Jun. 16, 2022, U.S. Appl. No. 17/102,627, filed Nov. 24, 2020.

\* cited by examiner

ELECTRONIC SUBSCRIBER IDENTITY MODULE (ESIM) PROFILE PROVISIONING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless communication devices are provided with an embedded electronic subscriber identity module (eSIM) that defines wireless communication service provider data and wireless communication service subscriber data. A wireless communication device may be provisioned for wireless communication service on a radio access network (RAN), in part, by loading appropriate data and executables into the eSIM in the wireless communication device. In some contexts the data and/or executables loaded into the eSIM may be referred to as an eSIM profile. By presenting credentials and/or keys stored in the eSIM (e.g., one or more data elements of the eSIM profile) to an access node or cell site a wireless communication device may be authenticated and authorized by the radio access network (RAN) and provided a wireless communication link by the access mode.

SUMMARY

In an embodiment, a method of provisioning a mobile communication device having a first electronic subscriber identity module (eSIM) profile active with a second eSIM profile, where the first eSIM profile is associated with a first wireless communication network and the second eSIM profile is associated with a second wireless communication network is disclosed. The method comprises receiving an indication by an application executing on a computer system that a subscriber associated with a mobile communication device provisioned with a first eSIM profile associated with a first mobile communication network is traveling to a destination having wireless communication service provided by a second mobile communication network and maintaining a pool of eSIM profiles associated with the second wireless communication network by the application in a non-transitory memory of the computer system. The method further comprises designating a second eSIM profile that is one of the eSIM profiles in the pool as allocated by the application, whereby the application is enabled to avoid allocating the second eSIM profiles concurrently to two different mobile communication devices and, after designating the second eSIM profile in the pool as allocated, sending a copy of the second eSIM profile to the mobile communication device whereby the mobile communication device is enabled to deactivate the first eSIM profile and to activate the second eSIM profile to obtain wireless communication services in the second wireless communication network. The method further comprises receiving an indication by the application that the mobile communication device has deactivated the second eSIM profile and, after receiving the indication that the mobile communication device has deactivated the second eSIM profile, designating the second eSIM profile in the pool as unallocated by the application.

In another embodiment, a method of providing a mobile communication device having a subscription account in a first wireless communication network with wireless communication service in a second wireless communication network is disclosed. The method comprises sending a message defining an association of a first international mobile subscriber identity (IMSI) and a phone number associated with a mobile communication device for use in obtaining wireless communication service in a first wireless communication network by an application executing on a computer system to a second wireless communication network and building an IMSI mapping between the first IMSI and the phone number to a second IMSI associated with the second wireless communication network. The method further comprises providing wireless communication service to the mobile communication device by the second wireless communication network based on a subscription account maintained by the second wireless communication network associated with the second IMSI, whereby the mobile communication device is provided with wireless communication service out of its home subscription area based on the subscription account maintained by the second wireless communication network.

In yet another embodiment, a computer system for provisioning a mobile communication device having a first electronic subscriber identity module (eSIM) profile active with a second eSIM profile, where the first eSIM profile is associated with a first wireless communication network and the second eSIM profile is associated with a second wireless communication network is disclosed. The system comprises a processor, a non-transitory memory, and an application stored in the non-transitory memory. When executed by the processor, the application receives an indication that a subscriber associated with a mobile communication device provisioned with a first eSIM profile associated with a first mobile communication network is traveling to a destination having wireless communication service provided by a second mobile communication network and maintains a pool of eSIM profiles associated with the second wireless communication network by the application in the non-transitory memory. The application further designates a second eSIM profile that is one of the eSIM profiles in the pool as allocated, whereby allocating the second eSIM profiles concurrently to two different mobile communication devices is avoided and, after designating the second eSIM profile in the pool as allocated, sends a copy of the second eSIM profile to the mobile communication device whereby the mobile communication device is enabled to deactivate the first eSIM profile and to activate the second eSIM profile to obtain wireless communication services in the second wireless communication network. The application further receives an indication that the mobile communication device has deactivated the second eSIM profile and, after receiving the indication that the mobile communication device has deactivated the second eSIM profile, designates the second eSIM profile in the pool as unallocated.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
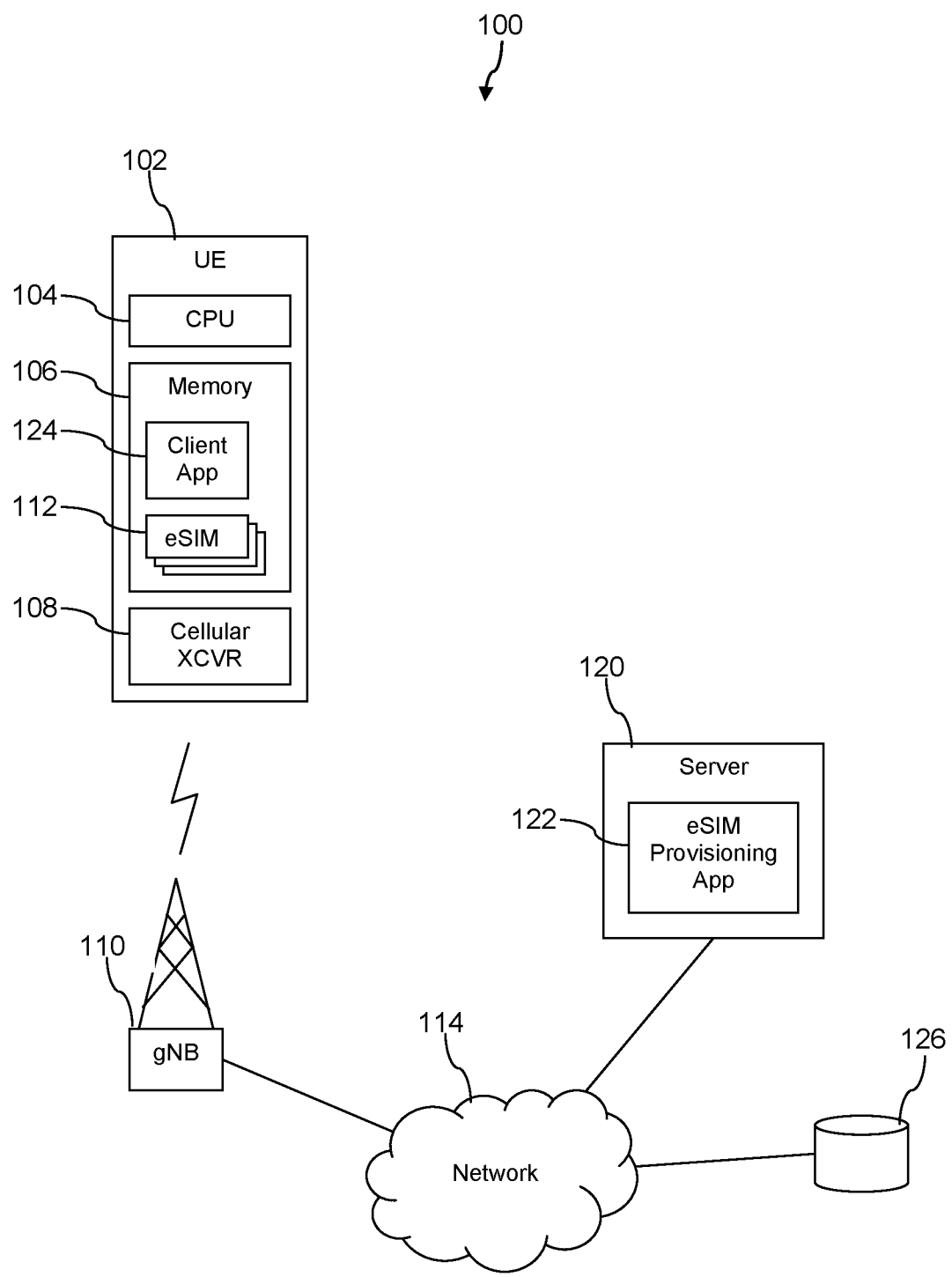
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

By providing wireless communication service provider data and wireless communication service subscriber data in the form of an eSIM profile to a wireless communication device, the device may be configured to request and receive wireless communication service from a radio access network (RAN). The eSIM profile may be stored in an embedded universal integrated circuit card (eUICC). Alternatively, the eSIM profile may be stored in a removable UICC, for example a removable SIM card. An eSIM profile comprises wireless communication service provider data and wireless communication service subscriber data. An eSIM profile may define a phone number, network access keys and network access credentials, encryption keys, preferred roaming lists (PRLs), executable applications, branding content, and/or other data.

By deactivating a first eSIM profile associated with a first RAN and activating a second eSIM profile associated with a second RAN, the wireless communication device may be enabled to engage in wireless communication in the second RAN as though the second RAN is the home network of the wireless communication device. Said in other words, when the first eSIM profile is active on the wireless communication device it may receive service in the first RAN with home subscriber privileges and it may receive service in the second RAN with roaming privileges. When the second eSIM profile is active on the wireless communication device, it may receive service in the second RAN with home subscriber privileges and it may receive service in the first RAN with roaming privileges.

The present disclosure teaches a system and methods for anticipating when a wireless communication device will operate in a foreign network (e.g., a network that is not the home network for which the device has a wireless communication service subscription account), loading an eSIM profile for home subscriber privilege access in the foreign network, deactivating a first eSIM profile associated with a home network and activating a second eSIM profile associated with the foreign network. In this way, the wireless communication device may be able to enjoy better wireless communication service in the foreign network and possibly avoid costly roaming charges while operating in the foreign network. In an embodiment, a wireless communication service provider may maintain a plurality of subscription accounts in a given foreign network and manage a pool of eSIM profiles associated with those subscription accounts. The service provider may allocate one of the eSIM profiles in the pool to a first device that is predicted to be operating in the associated foreign network at a first time and then allocate the same eSIM profile in the pool to a second device that is predicted to be operating in the associated foreign network at a second time, where the first time and second time do not overlap. In this way, a relatively small number of eSIM profiles in the pool may be rotated to provide temporary home subscriber privilege access in the foreign network.

In addition to providing improved performance relative to a roaming communication experience, the system disclosed can simplify the user's experience by avoiding the user having to make new arrangements with each different foreign network and possibly making separate payments to the several different foreign networks.

The disclosure teaches how an application can predict a device's travel out of the home network by developing a history of the user's movements over time and identifying travel patterns. In an embodiment, the prediction algorithm employs machine learning techniques. The application can associate different users to a same partition or category of users and predict the movements of a user based, in part, on the movements of a plurality of other users belonging to the same partition or category of users. In an embodiment, the application may interact with an electronic calendar of the user to infer travel plans and use this information to assist in predicting the device's travel out of the home network. In an embodiment, the application may present a user interface to the user for defining travel plans, whereby the application can assist the user by managing eSIM profiles on the user's wireless communication device to maintain home privilege wireless communication service for the user.

Part of the management of the pool of eSIM profiles in foreign networks that are rotated among wireless communication devices comprises maintaining a status of the eSIM profiles in the pool. For example, when an eSIM profile is marked as unallocated it can be considered available for allocation and use by a device. When an eSIM profile is marked as allocated it should not be allocated to a device. In an embodiment, wireless communication devices may store a plurality of eSIM profiles at a single time, only one of which is active. When a device is migrating into a foreign network (e.g., moving into wireless communication coverage provided by the foreign network) for which it stores an eSIM profile, the device would first obtain authorization from the application managing the pool of eSIM profiles. If the stored eSIM profile is allocated to a different mobile communication device, the device may request another eSIM profile for migrating into the foreign network.

The disclosed system provides a technical solution to a technical problem. Wireless communication devices obtain wireless access from a RAN based on an eSIM profile and are disadvantaged in various ways when operating in a foreign network—either a different carrier's network than the subscriber's home network within the United States or in a carrier network in a foreign country different from the United States. By establishing and managing a pool of eSIM profiles—a pool of data and application artifacts—the described system solves the problem of users receiving degraded and/or more costly service than they would receive in their home service network.

Turning now to FIG. 1, a system 100 is described. In an embodiment, system 100 comprises a user equipment (UE) 102 having a processor 104, a memory 106, and a cellular radio transceiver 108. The UE 102 may receive a wireless communication link from an access node (gNodeB (gNB)) 110 based on providing authentication credentials looked up in an active eSIM profile 112 stored in a non-transitory portion of the memory 106. The access node 110 may provide a wireless link to the UE 102 according to a 5G, a long term evolution (LTE), a code division multiple access (CDMA), a global system for mobile communications (GSM), or another telecommunication protocol. The access node 110 may communicatively couple the UE 102 to a network 114 whereby the UE 102 is enabled to communicate with other devices and/or computers likewise communicatively coupled to the network 114. The UE 102 may be a mobile phone, a smart phone, a personal digital assistant (PDA), a wearable computer, a headset computer, a laptop computer, a notebook computer, or a tablet computer. The network 114 comprise one or more private networks, one or more public networks, or a combination thereof. As will be discussed further with reference to FIG. 2A and FIG. 2B, the network 114 may comprise two or more different radio access networks (RANs).

The system 100 further comprises a server computer 120 that executes an eSIM provisioning application 122. The server computer 120 may be implemented as a computer system. Computer systems are described further hereinafter. The provisioning application 122 may interwork with an eSIM provisioning client application 124 stored in a non-transitory portion of the memory 106 that executes on the processor 104 to provide a plurality of eSIM profiles 112 to the UE 102. It may be desirable that the UE 102 conduct wireless communication in a first radio access network (RAN) operated by a first network operator using a first eSIM profile 112 and that the UE 102 conduct wireless communication in a second RAN operated by a second network operating using a second eSIM profile 112. In this way, for example, the UE 102 may enjoy communication privileges and services in each of the first RAN and the second RAN that are typically provided to home subscribers in each RAN.

The eSIM provisioning application 122 can anticipate a need of the UE 102 for an eSIM profile 112 in advance of the UE 102 entering a coverage area of a RAN operated by a network operator associated with the subject eSIM profile 112 and pre-load the subject eSIM profile 112 into the memory 106. When the UE 102 enters the coverage area of the network operator associated with the subject eSIM profile 112, the UE 102 can activate the subject eSIM profile 112 or the eSIM provisioning application 122 can command the UE 102 to activate the subject eSIM profile 112. The eSIM provisioning application 122 may look-up the desired eSIM profile 112 in a data store 126 and provide a copy of the looked-up eSIM profile 112 to the UE 102. The eSIM profiles 112 in the data store 126 may constitute one or more pools of eSIM profiles 112.

Figure 2A:
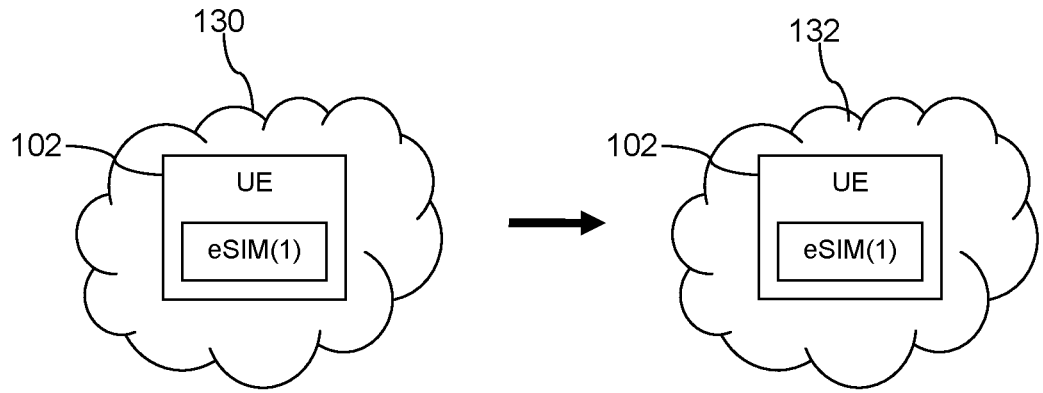
FIG. 2A, FIG. 2B, and FIG. 2C are illustrations of different memory states of a user equipment (UE) according to an embodiment of the disclosure.
Figure 2B:
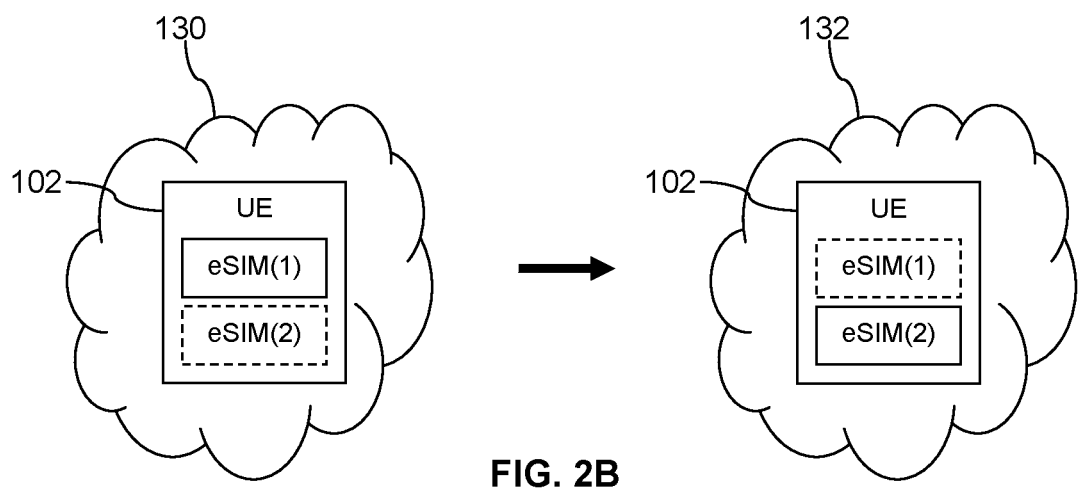
Figure 2C:
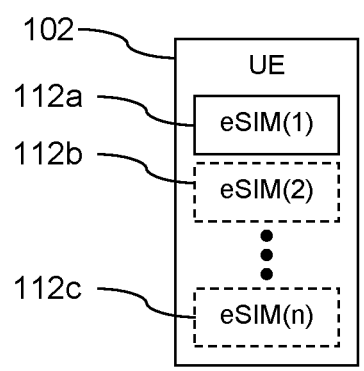

Turning now to FIG. 2A, FIG. 2B, and FIG. 2C, the use of different eSIM profiles of the UE 102 are described. In FIG. 2A, the UE 102 stores a single eSIM profile 112 designated by 'eSIM(1).' Initially the UE 102 is operating in a coverage area of a first RAN 130 and then migrates into the coverage area of a second RAN 132. The 'eSIM(1)' is provided home subscriber communication privileges in first RAN 130 but is granted roaming communication privileges in the second RAN 132. As such, the UE 102 communicating based on 'eSIM(1)' in the second RAN 132 may have restricted access to the communication services provided by the second RAN 132 and may be charged extra fees. Generally it is undesirable for the UE 102 to have its access to communication services restricted or curtailed and it is undesirable for the user of the UE 102 to be charged extra fees. The first RAN 130 may provide a wireless link to the UE 102 according to a 5G, a long term evolution (LTE), a code division multiple access (CDMA), a global system for mobile communications (GSM), and/or another telecommunication protocol. The second RAN 132 may provide a wireless link to the UE 102 according to a 5G, a long term evolution (LTE), a code division multiple access (CDMA), a global system for mobile communications (GSM), and/or another telecommunication protocol. The first RAN 130 and/or the second RAN 132 may provide wireless communication links according to two or more different telecommunication protocols, as for example when a new telecommunication protocol coexists in the same RAN with a legacy telecommunication protocol.

In FIG. 2B, the UE 102 stores two eSIM profiles 112—'eSIM(1)' and 'eSIM(2).' In the left portion of FIG. 2B, the solid box around 'eSIM(1)' indicates that it is the activated eSIM profile 112 and the dashed line box around 'eSIM(2)' indicates that it is not an active eSIM profile 112. Typically only a single eSIM profile 112 is active on the UE 102 at one time. In the right portion of FIG. 2B, the dashed line box around 'eSIM(1)' indicates that it is not an active eSIM profile 112 and the solid box around 'eSIM(2)' indicates that it is the activated eSIM profile 112. As illustrated in FIG. 2B, when the UE 102 is operating in the coverage area of the first RAN 130, the 'eSIM(1)' eSIM profile 112 is active and the UE 102 is provided home subscriber communication privileges in the first RAN 130, and when the UE 102 is operating in the coverage area of the second RAN 132, the 'eSIM(2)' eSIM profile 112 is active and the UE 102 is provided home subscriber communication privileges in the second RAN 132.

In FIG. 2C, the UE 102 is illustrated as storing a plurality of three or more eSIM profiles 112. As the UE 102 migrates into coverage areas of different RANs, the UE 102 or the eSIM provisioning application 122 can deactivate the currently active eSIM profile 112 and activate a different eSIM profile 112 that is associated with the RAN that the UE 102 is then migrating into. In this way, the UE 102 can enjoy and benefit from home subscriber privileges in a plurality of RANs that formerly the UE 102 would instead have suffered by only having roaming access privileges.

The memory 106 may have limited non-transitory memory available for storing eSIM profiles 112, and hence the UE 102 may not be pre-loaded with an unlimited number of eSIM profiles 112. Desirably, the eSIM profiles 112 stored in the memory 106 may be managed by the eSIM client application 124 or by the eSIM provisioning application 122 so that the non-transitory memory of memory 106 allocated for storage of eSIM profiles 112 is not over-run and so that an eSIM profile 112 associated with a RAN into which the UE 102 is bound to enter is among the stored eSIM profiles 112. To this end, the eSIM provisioning application 122 analyzes both travel plans associated with the UE 102 and a history of travel of the UE 102 to estimate or predict when the UE 102 may roam into or migrate into the coverage of different RANs. Alternatively, the eSIM provisioning application 122 analyzes only travel plans associated with the UE 102 to estimate or predict when the UE 102 may roam into or migrate into the coverage of different RANS. Alternatively, the eSIM provisioning application 122 analyzes only a history of travel of the UE 102 to estimate or predict when the UE 102 may roam into or migrate into the coverage of different RANS.

In an embodiment, the eSIM provisioning application 122 may access a calendar application that executes on the UE 102 to determine a travel itinerary of the user associated with the UE 102. The eSIM provisioning application 122 may provide a user interface on the UE 102, for example via interworking with the eSIM client application 124, that prompts the user of the UE 102 to enter in travel plans. For example, if a user is planning to travel to Canada or to France, the user may use the user interface provided on the UE 102 to define a duration of time that the UE 102 will be located in Canada or in France. The eSIM provisioning application 122 may then look-up an eSIM profile 112 for obtaining wireless communication service with home subscriber privileges in the subject country and pre-load this on the UE 102 just prior to the date the user indicated he or she would be traveling in the other country.

The eSIM provisioning application 122 may maintain a pool of eSIM profiles 112 associated with different RANs—different RANs within the US and/or different RANs located outside of the US. The eSIM provisioning application 122 may pay for subscription accounts with wireless service providers for each of the different eSIM profiles 112, such that each different eSIM profile 112 is associated with home subscriber communication privileges and communication services in the subject RAN. The eSIM provisioning application 122 may then manage the sharing of these eSIM profiles 112 among a plurality of UEs 102. For example, a first eSIM profile 112 associated with a first RAN may be allocated to and used by a first UE 102 at a first time to obtain home subscriber communication privileges in the first RAN, and the first eSIM profile 112 may be allocated to and used by a second UE 102 at a second time to obtain home subscriber communication privileges in the second RAN. Likewise, a second eSIM profile 112 associated with a second RAN may be allocated to and used by the first UE 102 at a third time to obtain home subscriber communication privileges in the second RAN, and the second eSIM profile 112 may be allocated to and used by a third UE 102 at a fourth time to obtain home subscriber communication privileges in the second RAN. In this way, the eSIM provisioning application 122 can rotate a relatively small pool of eSIM profiles 112 among a large number of different UEs 102.

In an embodiment, the data store 126 may not store actual eSIM profiles 112 but rather store handles or indexes to the eSIM profiles 112. The eSIM profiles 112 may be provided by either the operators of the different RANs or by a trusted institution. eSIM profiles 112 are valuable and highly secure data artifacts and the creation and distribution of eSIM profiles 112 is highly controlled. It may be desirable to leave eSIM profiles 112 loaded in the memory 106, when possible (e.g., when the non-transitory portion of memory allocated to storing eSIM profiles 112 is not exhausted) to avoid incurring the cost of reloading the same or equivalent eSIM profile 112 in the future, because there may be a set recurring fee for the generation of each eSIM profile 112. In an embodiment, instead of providing a copy of an eSIM profile 112 by the eSIM provisioning application 122 to the UE 102, the eSIM provisioning application 122 may instead provide a handle to or a reference to the eSIM profile 112 to the UE 102, and the eSIM client application 124 uses the handle or reference for the eSIM profile 112 to retrieve the copy of the eSIM profile 112 from the subject RAN operator or from the trusted institution.

Figure 3:
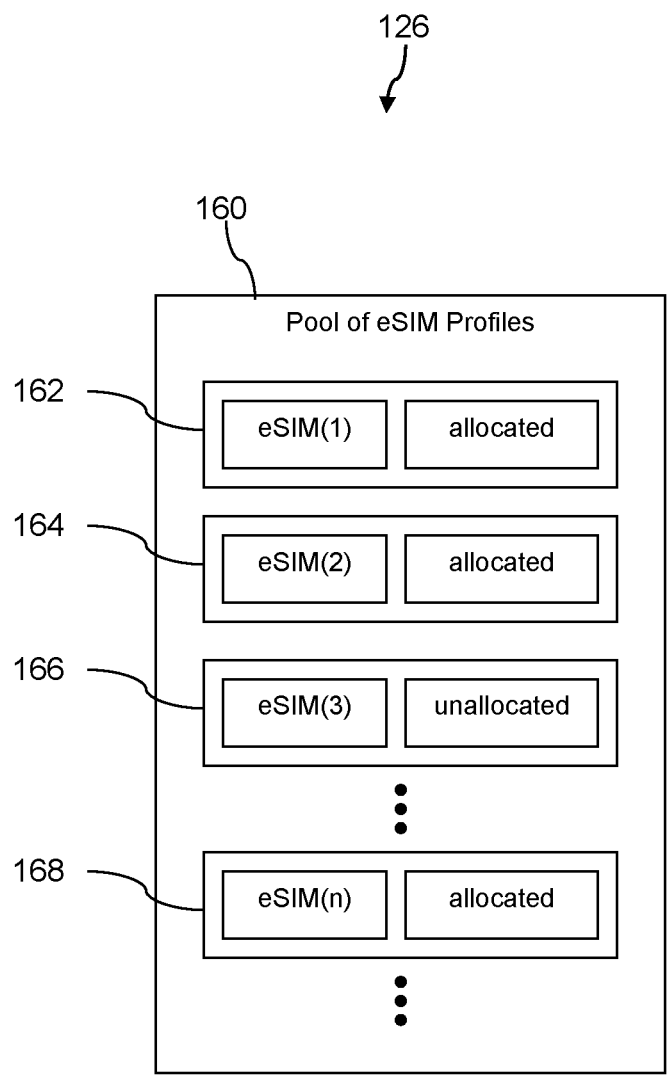
FIG. 3 is an illustration of a data structure for a pool of eSIM profiles according to an embodiment of the disclosure.

Turning now to FIG. 3, a pool of eSIM profiles 160 is described. The pool of eSIM profiles 160 comprises a first entry 162, a second entry 164, a third entry 166, and a fourth entry 168. Each entry comprises an eSIM profile and a status of allocated/unallocated. In another embodiment, each entry comprises a reference to or an index to an eSIM profile that can be used to obtain a copy of an eSIM profile. The status of an entry 162, 164, 166, 168 indicates whether the eSIM profile or index to the eSIM profile associated with the entry is allocated (e.g., is installed in a UE 102) or is unallocated (e.g., is free to be installed in a UE 102). The pool of eSIM profiles 160 may comprise any number of entries 162, 164, 166, 168. In an embodiment, the pool of eSIM profiles 160 is stored in the data store 126. In an embodiment, the data store 126 stores a plurality of pools of eSIM profiles 160, for example a different pool of eSIM profiles 160 for each different RAN supported by the eSIM provisioning application 122.

When the eSIM provisioning application 122 predicts that the UE 102 is going to be migrating into a coverage area of a RAN that is not associated with an eSIM profile 112 already stored in the memory 106 of the UE 102, the eSIM provisioning application 122 looks-up an entry in the pool of eSIM profiles 160. For example, the eSIM provisioning application 122 searches a pool of eSIM profiles 160 that corresponds with the RAN the UE 102 is predicted to roam into. When the eSIM provisioning application 122 finds an entry in the pool of eSIM profiles 160 that has an unallocated status, the eSIM provisioning application 122 may mark the status of the entry as allocated status and provide a copy of the eSIM profile associated with the entry to the UE 102 for storing in the memory 106. In an embodiment, the eSIM provisioning application 122 sends a copy of an eSIM profile 112 to the UE 102. In an alternative embodiment, the eSIM provisioning application 122 sends a reference or index to the associated eSIM profile 112 to the UE 102, and the UE 102 uses the reference or index to obtain a copy of the eSIM profile 112, for example from the network operator of the subject RAN or from a trusted institution. In an embodiment, the eSIM provisioning application 122 searches the pool of eSIM profiles 160 also based on other search prompts, for example a type of the UE 102 and/or a subscription plan associated with the UE 102.

Figure 4:
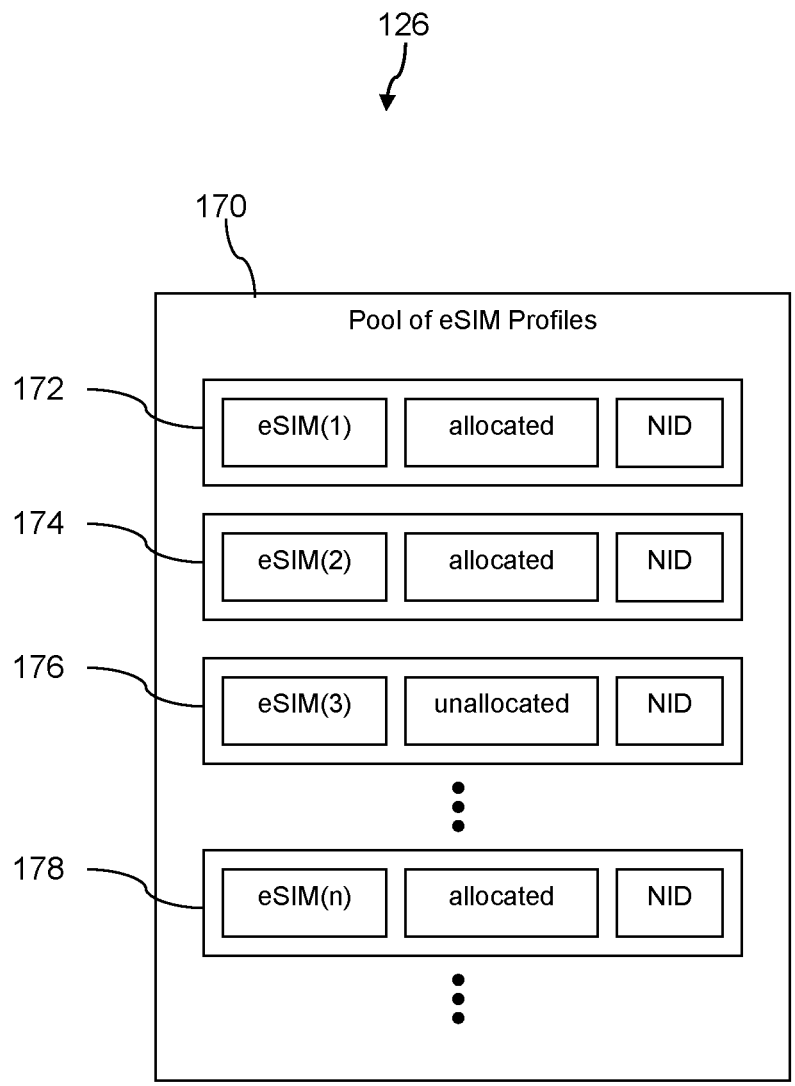
FIG. 4 is an illustration of another data structure for a pool of eSIM profiles according to an embodiment of the disclosure.

Turning now to FIG. 4, a pool of eSIM profiles 170 is described. In an embodiment, the pool of eSIM profiles 170 is stored in the data store 126. The pool of eSIM profiles 170 comprises a fifth entry 172, a sixth entry 174, a seventh entry 176, and an eighth entry 178. The entries 172, 174, 176, 178 are substantially similar to the entries 162, 164, 166, 168 of the pool of eSIM profiles 160 described above with reference to FIG. 3, with the difference that the entries 172, 174, 176, 178 each comprise a network identity field. When the eSIM provisioning application 122 searches the data store 126 for a suitable eSIM profile 112 to pre-load into the UE 102 it may specify a network identity of the RAN and identify an eSIM profile 112 for pre-loading based on the network identity.

Figure 5:
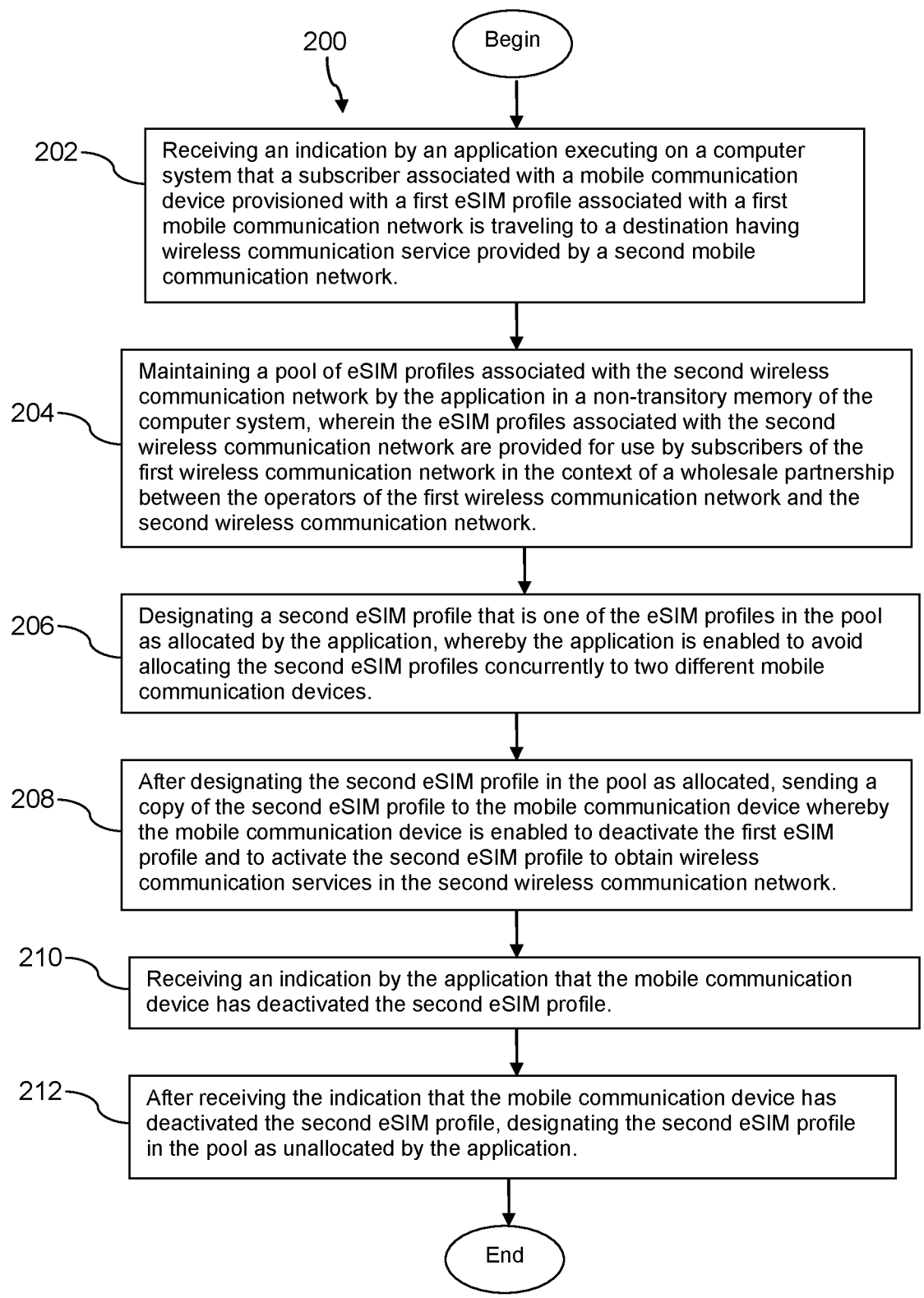
FIG. 5 is a flow chart of a method according to an embodiment of the disclosure.

Turning now to FIG. 5, a method 200 is described. In an embodiment, method 200 is a method of provisioning a mobile communication device having a first electronic subscriber identity module (eSIM) profile active with a second eSIM profile, where the first eSIM profile is associated with a first wireless communication network and the second eSIM profile is associated with a second wireless communication network. At block 202, the method 200 comprises receiving an indication by an application executing on a computer system that a subscriber associated with a mobile communication device provisioned with a first eSIM profile associated with a first mobile communication network is traveling to a destination having wireless communication service provided by a second mobile communication network.

At block 204, the method 200 comprises maintaining a pool of eSIM profiles associated with the second wireless communication network by the application in a non-transitory memory of the computer system, wherein the eSIM profiles associated with the second wireless communication network are provided for use by subscribers of the first wireless communication network in the context of a wholesale partnership between the operators of the first wireless communication network and the second wireless communication network. For example, the operator of the first wireless communication network may negotiate a monthly or annual price with the operator of the second wireless communication network for a specified number of eSIM profiles associated with the second wireless communication network to be maintained in the pool by the operator of the first wireless communication network. The negotiated agreement may stipulate a maximum amount of service (e.g., data limits, SMS limits, voice minute limits, etc.) and a cost for overages. These overages may be rolled up into an aggregate amount and billed periodically to the operator of the first wireless communication network. The operator of the first wireless communication network may estimate these overages and roll these into a cost for this kind of extended service (service outside the home network provided by the first wireless communication network). Alternatively, the overages may be tracked per eSIM profile and reported to the operator of the first wireless communication network who may then impose extra fees on the subscriber who created the overages. The operator of the second wireless communication network may negotiate a similar agreement to provide this kind of extended service for its subscribers (e.g., service outside the home network provided by the second wireless communication network), although the numbers of eSIM profiles associated with the first wireless communication network maintained in a pool by the operator of the second wireless communication network and the usage limits need not be the same for the subscribers of the second wireless communication network.

At block 206, the method 200 comprises designating a second eSIM profile that is one of the eSIM profiles in the pool as allocated by the application, whereby the application is enabled to avoid allocating the second eSIM profiles concurrently to two different mobile communication devices. In an embodiment, the application predicts when the wireless communication device is migrating into the second wireless communication network before designating the second eSIM profile in the pool as allocated and before sending the second eSIM profile to the mobile communication device. The application may predict when the wireless communication device is migrating into the second wireless communication network based on analyzing a history of travel of the mobile communication device. The application may predict when the wireless communication device is migrating into the second wireless communication network based on analyzing travel plans associated with the wireless communication device. The application may predict when the wireless communication device is migrating into the second wireless communication network based on analyzing both a history of travel of the mobile communication device and based on analyzing travel plans associated with the wireless communication device.

At block 208, the method 200 comprises, after designating the second eSIM profile in the pool as allocated, sending a copy of the second eSIM profile to the mobile communication device whereby the mobile communication device is enabled to deactivate the first eSIM profile and to activate the second eSIM profile to obtain wireless communication services in the second wireless communication network. At block 210, the method 200 comprises receiving an indication by the application that the mobile communication device has deactivated the second eSIM profile. At block 212, the method 200 comprises, after receiving the indication that the mobile communication device has deactivated the second eSIM profile, designating the second eSIM profile in the pool as unallocated by the application.

In an embodiment, after receiving the indication that the mobile communication device has deactivated the second eSIM profile, the method 200 may further comprise receiving an indication by the application that the mobile communication device wants to activate the second eSIM profile. After receiving the indication that the mobile communication device wants to activate the second eSIM profile, the method 200 may further comprise determining by the application that the second eSIM profile is designated as unallocated in the pool. After receiving the indication that the mobile communication device wants to activate the second eSIM profile and after determining that the second eSIM profile is designated as unallocated in the pool, the method 200 may further comprise designating by the application that the second eSIM profile is designated as allocated in the pool. The method 200 may further comprise sending a message to the mobile communication device by the application authorizing the mobile communication device to activate the second eSIM profile.

After receiving the indication that the mobile communication device wants to activate the second eSIM profile, in the case that the application determines that the second eSIM profile is instead designated as allocated (e.g., the second eSIM profile is current allocated for use to a different mobile communication device for use in the second wireless communication network), the application sends a message to the mobile communication device denying the request by the mobile communication device to activate the second eSIM profile. Also in this case, the application may find a third eSIM profile that is one of the eSIM profiles in the pool of eSIM profiles that is suitable for use by the mobile communication device to communicate in the second wireless communication network. The application may designate the third eSIM profile in the pool as allocated and send a copy of the third eSIM profile to the mobile communication device, whereby the mobile communication device is enabled to activate the third eSIM profile to obtain wireless communication service in the second wireless communication network.

Figure 6:
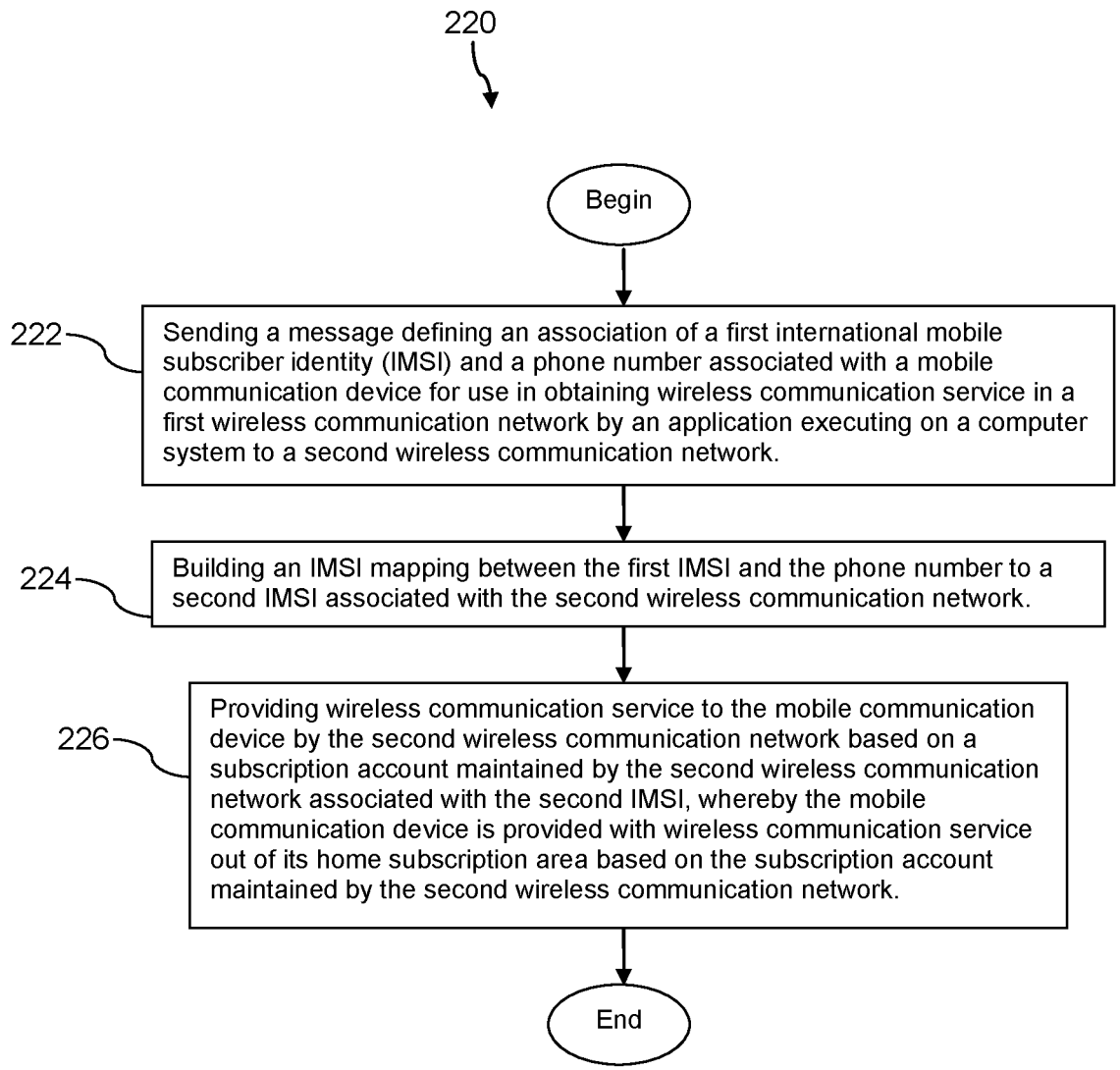
FIG. 6 is a flow chart of another method according to an embodiment of the disclosure.

Turning now to FIG. 6, a method 220 is described. In an embodiment, the method 220 comprises a method of providing a mobile communication device having a subscription account in a first wireless communication network with wireless communication service in a second wireless communication network. At block 222, the method 220 comprises sending a message defining an association of a first international mobile subscriber identity (IMSI) and a phone number associated with a mobile communication device for use in obtaining wireless communication service in a first wireless communication network by an application executing on a computer system to a second wireless communication network.

At block 224, the method 220 comprises building an IMSI mapping between the first IMSI and the phone number to a second IMSI associated with the second wireless communication network. At block 226, the method 220 comprises providing wireless communication service to the mobile communication device by the second wireless communication network based on a subscription account maintained by the second wireless communication network associated with the second IMSI, whereby the mobile communication device is provided with wireless communication service out of its home subscription area based on the subscription account maintained by the second wireless communication network.

Figure 7:
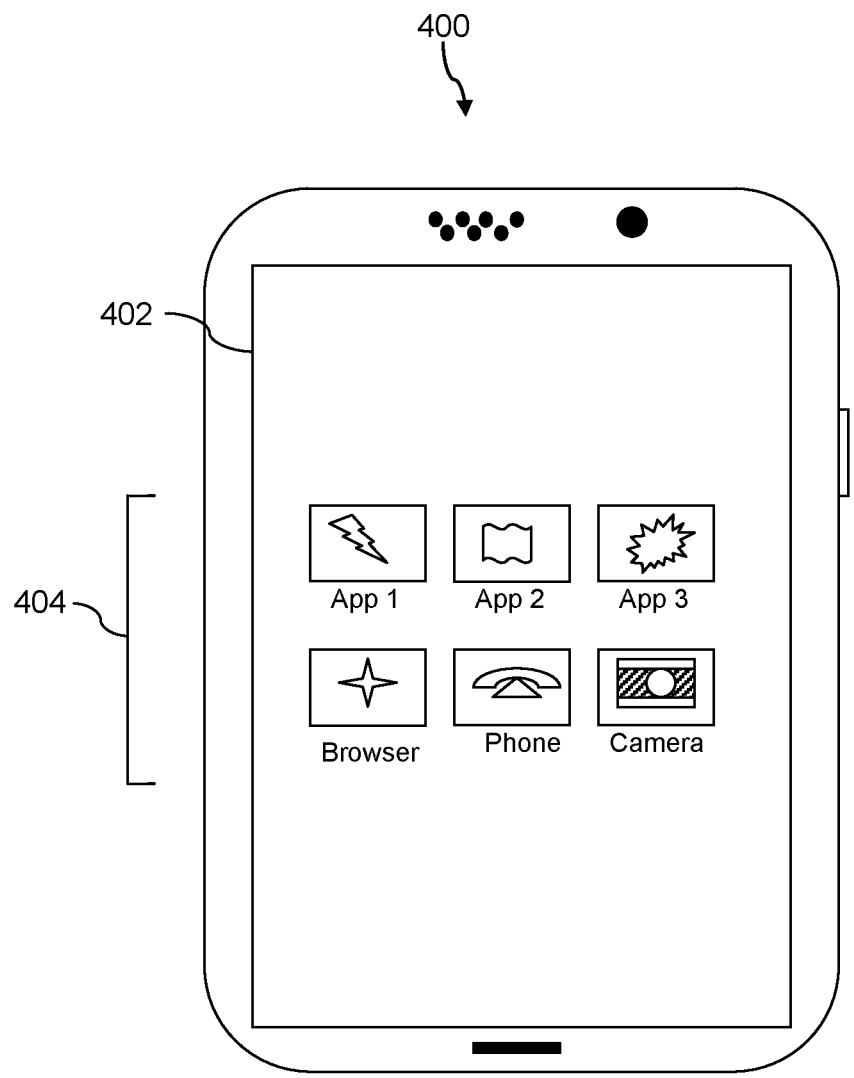
FIG. 7 is an illustration of a user equipment (UE) according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 8:
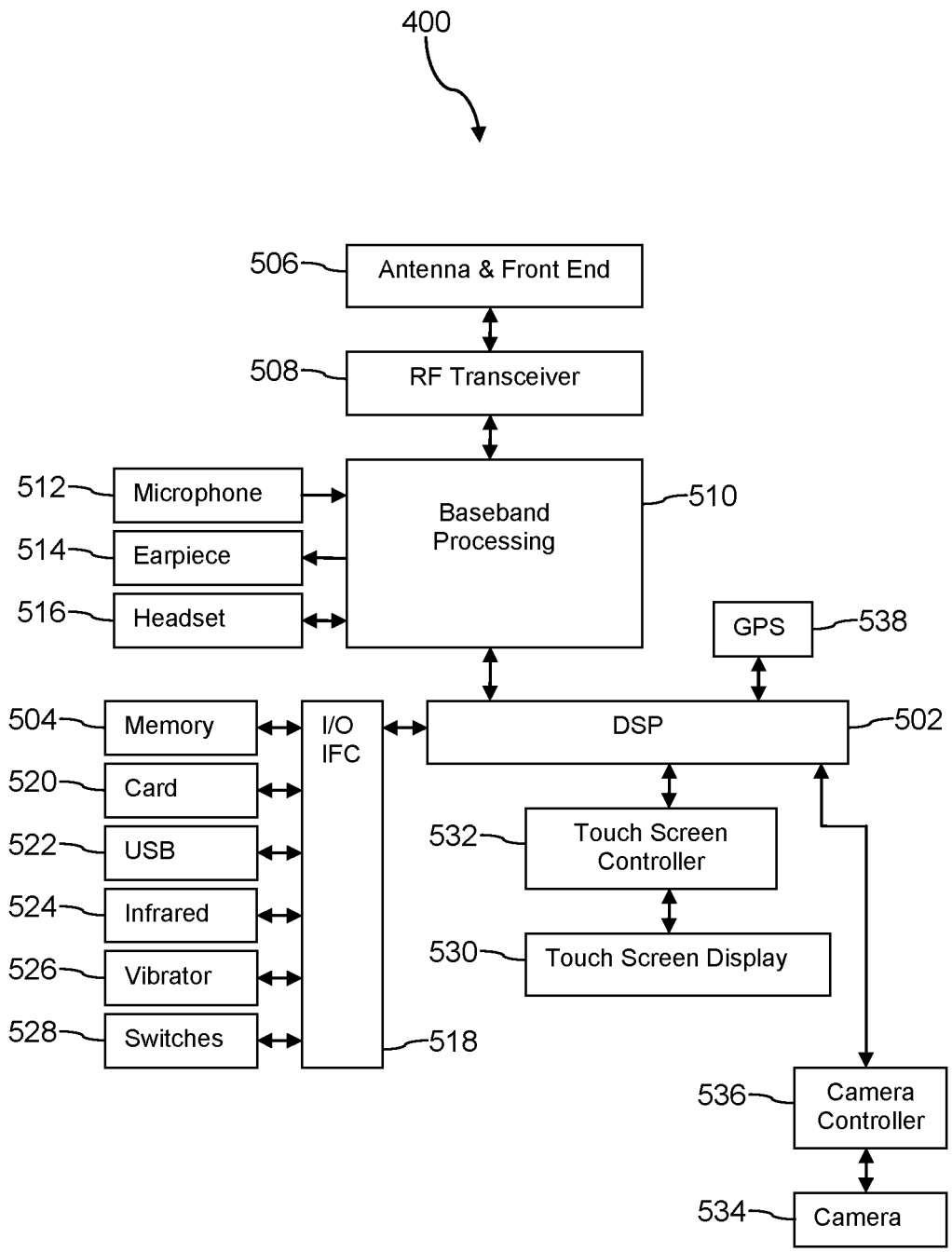
FIG. 8 is a block diagram of a hardware architecture for a user equipment (UE) according to an embodiment of the disclosure.

FIG. 8 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
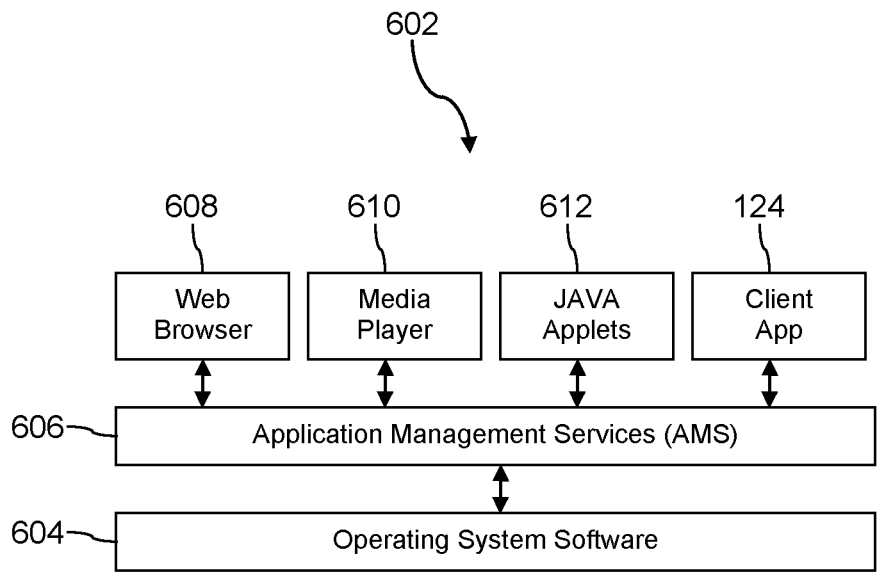
FIG. 9A is a block diagram of a software architecture for a user equipment (UE) according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 9A are a web browser application 608, a media player application 610, JAVA applets 612, and the client application 124 described above with reference to FIG. 1. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 9B:
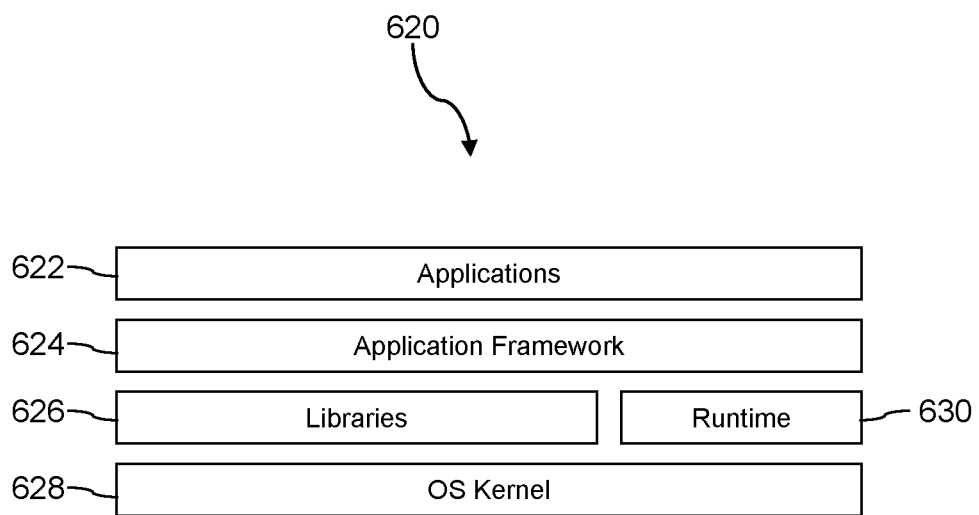
FIG. 9B is a block diagram of another software architecture for a user equipment (UE) according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
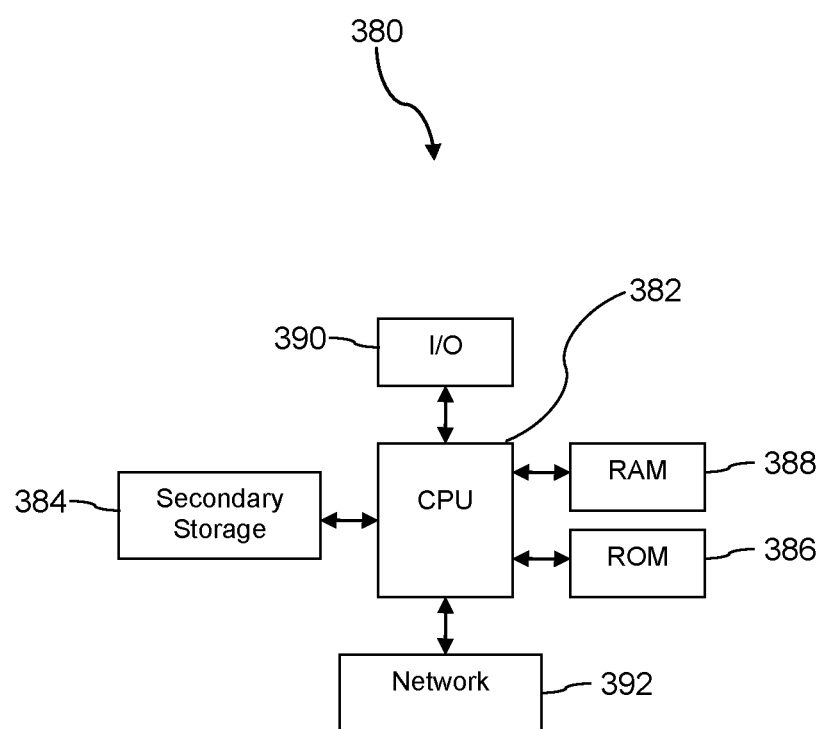
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID),. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a mobile communication device having a first electronic subscriber identity module (eSIM) profile active with a second eSIM profile, where the first eSIM profile is associated with a first wireless communication network and the second eSIM profile is associated with a second wireless communication network, comprising:
   receiving an indication by an application executing on a computer system that a subscriber associated with a mobile communication device provisioned with first eSIM profile associated with a first mobile communication network is traveling to a destination having wireless communication service provided by a second mobile communication network;
   maintaining a pool of eSIM profiles associated with the second wireless communication network by the application in a non-transitory memory of the computer system, wherein the eSIM profiles associated with the second wireless communication network are provided for use by subscribers of the first wireless communication network in the context of a wholesale partnership between the operators of the first wireless communication network and the second wireless communication network;
   designating a second eSIM profile that is one of the eSIM profiles in the pool as allocated to the mobile communication device that is predicted to be operating in the second mobile communication network at a first time by the application, whereby the application is enabled to avoid allocating the second eSIM profiles concurrently to two different mobile communication devices;
   after designating the second eSIM profile in the pool as allocated, sending a copy of the second eSIM profile to the mobile communication device whereby the mobile communication device is enabled to deactivate the first eSIM profile and to activate the second eSIM profile to obtain wireless communication services in the second wireless communication network;
   receiving an indication by the application that the mobile communication device has deactivated the second eSIM profile;
   after receiving the indication that the mobile communication device has deactivated the second eSIM profile, designating the second eSIM profile in the pool as unallocated by the application; and
   subsequently designating the second eSIM profile in the pool as allocated to a second mobile communication device that is predicted to be operating in the second mobile communication network at a second time by the application, wherein the first time and the second time do not overlap.

2. The method of claim 1, wherein the first and second eSIM profiles comprise wireless communication service provider data and wireless communication service subscriber data.

3. The method of claim 1, wherein the first eSIM profile comprises network access keys or network access credentials to access the first mobile communication network and the second eSIM profile comprises network access keys or network access credentials to access the second mobile communication network.

4. The method of claim 1, further comprising:
   after receiving the indication that the mobile communication device has deactivated the second eSIM profile, receiving an indication by the application that the mobile communication device wants to activate the second eSIM profile;
   after receiving the indication that the mobile communication device wants to activate the second eSIM profile, determining by the application that the second eSIM profile is designated as unallocated in the pool;
   after receiving the indication that the mobile communication device wants to activate the second eSIM profile and after determining that the second eSIM profile is designated as unallocated in the pool, designating by the application that the second eSIM profile is designated as allocated in the pool; and
   sending a message to the mobile communication device by the application authorizing the mobile communication device to activate the second eSIM profile.

5. The method of claim 1, wherein the first wireless communication network comprises a 5G radio access network.

6. The method of claim 5, wherein the first wireless communication network comprises a long term evolution (LTE) radio access network.

7. The method of claim 1, wherein the mobile communication device is a mobile phone, a smart phone, a personal digital assistant (PDA), a wearable computer, a headset computer, a laptop computer, a notebook computer, or a tablet computer.

8. A computer system for provisioning a mobile communication device having a first electronic subscriber identity module (eSIM) profile active with a second eSIM profile, where the first eSIM profile is associated with a first wireless communication network and the second eSIM profile is associated with a second wireless communication network, comprising:
   a processor;
   a non-transitory memory; and
   an application stored in the non-transitory memory that when executed by the processor:

receives an indication that a subscriber associated with a mobile communication device provisioned with a first eSIM profile associated with a first mobile communication network is traveling to a destination having wireless communication service provided by a second mobile communication network, maintains a pool of eSIM profiles associated with the second wireless communication network by the application in the non-transitory memory, wherein the eSIM profiles associated with the second wireless communication network are provided for use by subscribers of the first wireless communication network in the context of a wholesale partnership between the operators of the first wireless communication network and the second wireless communication network, designates a second eSIM profile that is one of the eSIM profiles in the pool as allocated to the mobile communication device that is predicted to be operating in the second mobile communication network at a first time, whereby allocating the second eSIM profiles concurrently to two different mobile communication devices is avoided, after designating the second eSIM profile in the pool as allocated, sends a copy of the second eSIM profile to the mobile communication device whereby the mobile communication device is enabled to deactivate the first eSIM profile and to activate the second eSIM profile to obtain wireless communication services in the second wireless communication network, receives an indication that the mobile communication device has deactivated the second eSIM profile, after receiving the indication that the mobile communication device has deactivated the second eSIM profile, designates the second eSIM profile in the pool as unallocated, and subsequently designate the second eSIM profile in the pool as allocated to a second mobile communication device that is predicted to be operating in the second mobile communication network at a second time, wherein the first time and the second time do not overlap.

9. The computer system of claim 8, wherein the first and second eSIM profiles comprise wireless communication service provider data and wireless communication service subscriber data.

10. The computer system of claim 8, wherein the first eSIM profile comprises network access keys or network access credentials to access the first mobile communication network and the second eSIM profile comprises network access keys or network access credentials to access the second mobile communication network.

11. The computer system of claim 10, wherein the first eSIM profile further comprises an executable application.

12. The computer system of claim 8, wherein the application predicts when the mobile communication device is migrating into the second wireless communication network before designating the second eSIM profile in the pool as allocated and before sending the second eSIM profile to the mobile communication device.

13. The computer system of claim 12, wherein the application predicts when the mobile communication device is migrating into the second wireless communication network based on analyzing a history of travel of the mobile communication device.

14. The computer system of claim 12, wherein the application predicts when the mobile communication device is migrating into the second wireless communication network based on analyzing travel plans associated with the mobile communication device.

* * * * *